United States Patent
Sapugay et al.

(10) Patent No.: US 9,626,717 B2
(45) Date of Patent: Apr. 18, 2017

(54) METHODS AND SYSTEMS FOR DYNAMIC AND EMBEDDABLE STOREFRONT WIDGET

(71) Applicant: Billeo, Inc., Santa Clara, CA (US)

(72) Inventors: Edwin Vito Sapugay, Foster City, CA (US); Srinivas Satyasai Sunkara, Sunnyvale, CA (US)

(73) Assignee: Billeo, Inc., Santa Clara, CA (US)

( * ) Notice: Subject to any disclaimer, the term of this patent is extended or adjusted under 35 U.S.C. 154(b) by 590 days.

(21) Appl. No.: 14/222,876

(22) Filed: Mar. 24, 2014

(65) Prior Publication Data

US 2014/0297456 A1    Oct. 2, 2014

Related U.S. Application Data

(60) Provisional application No. 61/805,295, filed on Mar. 26, 2013.

(51) Int. Cl.
*G06Q 30/00* (2012.01)
*G06Q 30/06* (2012.01)
*G06Q 50/00* (2012.01)

(52) U.S. Cl.
CPC ..... *G06Q 30/0641* (2013.01); *G06Q 30/0617* (2013.01); *G06Q 30/0619* (2013.01); *G06Q 30/0631* (2013.01); *G06Q 50/01* (2013.01)

(58) Field of Classification Search
CPC ............................... G06Q 30/08; G06Q 50/01
See application file for complete search history.

(56) References Cited

U.S. PATENT DOCUMENTS

| | | | | |
|---|---|---|---|---|
| 2008/0189274 | A1* | 8/2008 | Mann | G06F 17/30864 |
| 2010/0114739 | A1* | 5/2010 | Johnston | G06Q 30/0601 |
| | | | | 705/26.1 |
| 2012/0290399 | A1* | 11/2012 | England | G06Q 30/0282 |
| | | | | 705/14.66 |
| 2015/0332385 | A1* | 11/2015 | Hogg | G06Q 30/06 |
| | | | | 705/26.81 |

OTHER PUBLICATIONS

Social Media: A Virtual Storefront. Posted by tpe_536 on Jan. 17, 2012 [http://www.tpedesign.net/2012/01/17/social-media-a-virtual-storefront/].*
"Stipple aims to turn Web images into embedded storefronts". Aug. 21, 2011. David Henry. [http://www.retailcustomerexperience.com/articles/stipple-aims-to-turn-web-images-into-embedded-storefronts/].*

* cited by examiner

*Primary Examiner* — William Allen
(74) *Attorney, Agent, or Firm* — Next IP Law Group LLC

(57) ABSTRACT

Methods and systems for extracting and displaying one or more products on a virtual storefront embedded in a topical community web page are disclosed. The displayed products may then be purchased by a user or a community member or a member of the group or forum directly at the virtual storefront. The community web page is related to a particular interest or a context and hosts information or media related to that particular context. The systems and methods disclosed herein may facilitate the community web page administrator, community web page owner, or any other person in similar capacity to either select one or more products statically or the products are dynamically extracted from one or more of a connected storefront or a marketplace or both.

14 Claims, 6 Drawing Sheets

METHODS AND SYSTEMS FOR DYNAMIC AND EMBEDDABLE STOREFRONT WIDGET

CROSS-REFERENCE TO RELATED APPLICATION

This application claims benefit to U.S. Provisional Patent Application No. 61/805,295 filed on Mar. 26, 2013, which is incorporated by reference in its entirety.

FIELD OF THE INVENTION

The present disclosure relates generally to an online storefront, and more particularly, to a virtual storefront embedded into a topical online community web page providing an easy accessible shopping experience to various community members.

BACKGROUND OF THE INVENTION

A topical online community comprises a group of people interacting and sharing their views towards a topic of common interest. It may be a local or a worldwide community, providing a platform to people from different geographical locations to interact. A topical online community may be a blog, a web forum, a social networking website, a video-sharing website, and the like. A topical online community generally contains a plurality of topical community web pages also known as a fan page, a group or channel that contain data related to a particular topic. A member or user of the topical online community may access such a fan page, group or channel and thereon may access to data posted on the same. A popular example of a topical online community is Facebook®, where friends, acquaintances and the like may interact, share pictures, videos, like fan pages, subscribe to groups of their interest and a lot like it. Another example of a topical online community is YouTube®, which provides a worldwide platform for people to share their videos wherein community members are free to watch or comment on the various videos posted by various people and may also subscribe to a channel related to a topic such as cricket, rock music, and the like. Yet another example is Twitter®, where the registered users can read, post short messages and comment on short messages. People can thus use such sites to interact with people globally and browse information relating to specific topics.

Online shopping is a form of e-commerce, which allows customers to purchase available products without having to go out of their homes to buy products of their choice. Online shopping also provides geographically distributed vendors to connect with their potentials customers without having to be physically located near them. At present, a large number of websites are available that are creating a global platform for online shopping. These websites allow their users to view entire lists of products they wish to buy, providing them with a wide variety of options to choose. The transactions also are made through secure encrypted communication pipes, thus, making it secure and comfortable for the customers to shop. In a scenario, a website may be a storefront for a particular brand or a particular merchant. In another scenario, a website may be a marketplace containing a collection of products aggregated across multiple merchants.

Such an online storefront may allow the customers to select and pay for an online product of their choice, including providing information about the product features, specifications, appearance, pricing, availability and the like. A major limitation of this system is that the products being displayed on the storefront may not be required by the users or may not be of any interest to the users. Another limitation of the systems and methods available at present is that a typical online storefront is located in a specific web address that a user needs to know and visit for making a purchase. Moreover, the storefront owner needs to expend money in order to advertise such a web address so that the potential customers know the web location of the storefront.

Though there exist a mechanism for contextual online ads providing a means for promotion of products or services that may be displayed to the customers based on their interests, however, such promotions may not necessarily lead to a sale. Online ads upon being clicked direct the user to a web page where a sale may be closed; however, a contextual online ad does not get the user to directly purchase an item. Moreover, the contextual ad may direct the user to a storefront that may not have the full context; hence, the products displayed at the storefront may not be context relevant. There exists a need for combining the benefits of a contextual advertisement with that of a topical online community for providing a contextual sales experience. Moreover, there exists a need for conveniently embedding a virtual storefront in a community web page that dynamically provides relevant product suggestions to community members thus helping a community web page, fan page, group or channel administrator to monetize his efforts.

BRIEF SUMMARY OF THE INVENTION

It will be understood that this disclosure in not limited to the particular systems, and methodologies described, as there can be multiple possible embodiments of the present disclosure which are not expressly illustrated in the present disclosure. It is also to be understood that the terminology used in the description is for the purpose of describing the particular versions or embodiments only, and is not intended to limit the scope of the present disclosure.

The present disclosure relates to systems and methods that deal with the above mentioned issues. The present disclosure provides mechanism for extracting and displaying one or more products on a virtual storefront embedded in a topical community web page such as a Facebook® fan page, Facebook® group, a Twitter® tweet, a YouTube® channel or a video and the like. The displayed products may then be purchased by a user or a community member or a member of the group or forum directly at the virtual storefront. The topical community web page is a constituent web page of a topical online community that enables a plurality of users to create an account and share information and media based on personal interest. The community web page is related to a particular interest or a context and hosts information or media related to that particular context. The systems and methods described herein may facilitate the community web page administrator, community web page owner, or any other person in similar capacity to either select one or more products statically or the products are dynamically extracted from one or more of a connected storefront or a marketplace or both. Such a system and method enhances the possibility of sales as the product is based on the context of the community web page on which it is displayed and the product may be purchased at the community web page itself thereby providing a seamless interaction for the user.

The present disclosure describes a virtual storefront that may be embedded within an online community web page related to a particular topic such as a rock band fan page, a comedian fan page, a sports related group, a classical music related channel, and the like. It allows a customer to view and purchase various products being displayed for sale on the community web page itself without being directed to a separate vendor website. Such a virtual storefront may be implemented as a widget on the community web page, fan page, group, tweet, channel or a video displayed by the channel, by the community web page administrator. A member of the community web page may access the widget for accessing the virtual storefront and may select a relevant product displayed on the storefront. The present disclosure with the help of enclosed diagrams and detailed description further illustrate the method of extracting and displaying context related products to a member.

In an embodiment, a virtual storefront system is configured for dynamically displaying one or more products in a virtual storefront embedded in a topical online community web page for selling. The virtual storefront system may comprise of a topical online community server connected to a user terminal via a network and configured for presenting the topical online community web page of a topical online community on the user terminal and dynamically generating statistical information of the topical online community web page. The virtual storefront system may also comprise of a virtual storefront server communicatively coupled with a virtual storefront database comprising statistical information related to the one or more products, the topical online community server and at least one of storefront server and marketplace server containing information relating to the one or more products. The virtual storefront server may be configured for extracting information relating to the one or more products from the at least one of storefront server and marketplace server based on one or more parameters, wherein the one or more parameters comprises of one or more keywords provided by an administrator of the topical online community web page dynamically selecting at least one product from the extracted one or more products based on at least one of the statistical information related to the one or more products, the one or more parameters, and one or more attributes of a user accessing the topical online community web page; extracting and optimizing a storefront template from one or more storefront templates stored in the virtual storefront database based on attributes related to the user terminal and topical online community; dynamically arranging the information relating to selected at least one product according to the extracted storefront template based on either the one or more parameters or the statistical information related to the topical online community web page; sending the optimized storefront template and the dynamically arranged information relating to the selected at least one product to the topical online community server for display at the user terminal; and receiving one or more user transaction instructions from the user terminal via the topical online community server for enabling a purchase at the virtual storefront server.

In another embodiment, a virtual storefront embedded in a topical online community web page of a topical online community may comprise of a template extracted from one or more storefront templates stored in a virtual storefront database and optimized thereon by a virtual storefront server, wherein the template is extracted and optimized based on attributes related to a user terminal and the topical online community; and at least one product placed within the extracted storefront template and arranged based on either one or more parameters provided by an administrator of the topical online community web page or statistical information related to the topical online community web page, wherein the at least one product is selected from a group of one or more products based on at least one of statistical information related to the one or more products, one or more parameters provided by an administrator of the topical online community web page, and one or more attributes of a user accessing the topical online community web page.

In another embodiment, a processor implemented method for embedding and configuring a virtual storefront in a topical online community web page of a topical online community is described. The method comprising extracting one or more products by a virtual storefront server from at least one of storefront server and marketplace server based on one or more parameters, wherein the one or more parameters comprises of one or more keywords provided by an administrator of the topical online community web page; dynamically selecting at least one product from the extracted one or more products by the virtual storefront server based on at least one of statistical information related to the one or more products, and one or more attributes of a user accessing the topical online community web page; extracting and optimizing a storefront template by the virtual storefront server from one or more storefront templates stored in a virtual storefront database based on attributes related to a user terminal used by the user and the topical online community; dynamically arranging the information relating to selected at least one product according to the extracted storefront template based on either the one or more parameters or the statistical information related to the topical online community web page; sending the optimized storefront template and the dynamically arranged information relating to the selected at least one product to a topical online community server related to the topical online community forum for display at the user terminal.

It is one of the objects of the present invention to display and enable for purchase one or more products in a storefront embedded in a topical community web page.

It is another object of the present invention to dynamically display and enable for purchase one or more products related to the context of the community web page.

It is another object to serve up a storefront to the users at the peak of contextual interest.

It is another object to provide a virtual storefront that is active within the context of the on-topic community and purchases can be made directly in the in-context storefront.

DETAILED DESCRIPTION

Figure 1:
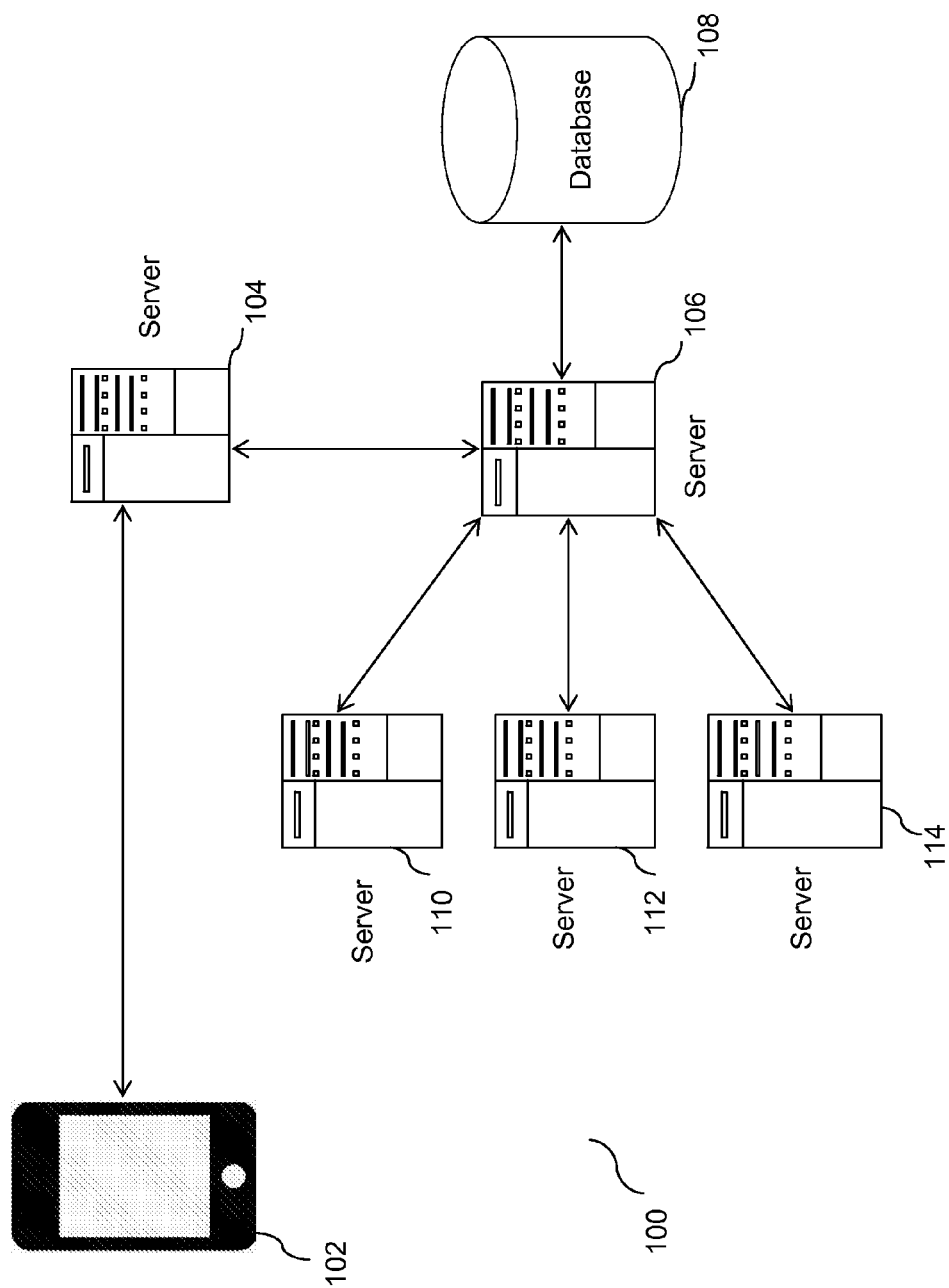
FIG. 1 illustrates a virtual storefront system for extracting, arranging, displaying and enabling purchase of one or more products on a virtual storefront on a user terminal according to an embodiment.

Some embodiments of this invention, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

It should be noted that the terms 'user', 'member' and 'community member', the terms 'community web page administrator' and 'administrator' are used interchangeably herein. Further, a topical community web page includes a web page or a media embedded in the web page according to the present disclosure. The terms are used interchangeably herein without deviating from the essence of the present invention.

The present disclosure describes a virtual storefront that may be embedded within a topical community web page of a topical online community. The topical online community may include a plurality of topical community web pages that relate to a particular context or topic such as a community web page for cricket, football, a football club, a rock band, and the like. The topical community web page provides information regarding a particular topic that may interest a plurality of community members of the topical online community. The community members may be enabled to join or like the topical community web page of interest thereby providing access to the content of the topical community web page such as photographs, videos, and the like. In an embodiment, a virtual storefront may be embedded by an administrator of the topical community web page for enabling purchase of one or more products related to the topic or context of the community web page. For example, the administrator for a fan page related to a heavy metal band may enable the community members to buy records, T-shirts, concert tickets, merchandise, and the like via the embedded virtual storefront. The virtual storefront may enable members to view and purchase various products displayed in the virtual storefront embedded on the community web page. In an aspect, the virtual storefront may be embedded as a virtual storefront widget embedded in the community webpage itself without directing to a separate vendor website.

Referring to FIG. 1, a virtual storefront system (100) is described according to an embodiment. The virtual storefront system enables extracting, arranging and displaying products on a virtual storefront on a user terminal based on a plurality of factors as described below in the present description. The virtual storefront system (100) mainly comprises of a user terminal (102) that may be utilized by a topical community web page administrator for embedding and managing a virtual storefront. In an aspect, the virtual storefront may be embedded in the topical community webpage as a widget that may be accessed by a member. A similar user terminal (102) may be utilized by a member of the topical community webpage for accessing the topical community web page. In an aspect, user terminal (102) may be a device such as a smartphone, tablet, laptop, personal computer, and the like, that is connected to a network such as internet and is configured to log in to the topical online community and access the topical community web page. The topical online community and the related topical community web pages may be hosted by a topical online community server (104). The topical online community server (104) may comprise of one or more interconnected servers and databases that facilitate managing the topical online community. The topical online community server (104) may store a plurality of information such as information related to the members of the topical online community, information related to the topical community web pages, and the like. In an aspect, the topical online community server (104) may be configured for generating statistical information of one or more topical online community web pages hosted by the server. The statistical information of the topical online community web page may comprise of information such as number of members of the community webpage, number of likes registered for a particular post, number comments on a forum discussion post, and the like.

The topical online community server (104) is communicatively coupled with a virtual storefront server (106). The virtual storefront server (106) is communicatively coupled with a virtual storefront database (108). The virtual storefront server (106) may in turn be coupled to one or more storefront servers (110) and marketplace servers (112 and 114) that are the source of a product and store information related such products. The one or more storefront servers (110) and marketplace servers (112 and 114) may be maintained by different individual administrators and storefront/marketplace owners that are configured to be queried by the virtual storefront server (106) for purchase purpose. For example, storefront servers (110) and marketplace servers (112 and 114) may belong to top retailers providing the product displayed in the embedded virtual storefront. The one or more storefront servers (110) and marketplace servers (112 and 114) may have independent storage and computational architecture. In an aspect, during the configuration of the virtual storefront system (100) the storefront servers and marketplace servers to be queried by the virtual storefront server may be statically selected and configured. In another aspect, the storefront servers (110) and marketplace servers (112 and 114) to be queried by the virtual storefront server may be dynamically selected from a wide range of available storefront/marketplace servers upon receiving a query from the user or member. The storefront servers and marketplace servers may be dynamically selected by means of an application programming interface established with the topical community server configured for inspecting the wide range of available storefront/marketplace servers for product extraction. The actual product sale may be facilitated by the storefront servers (110) and marketplace servers (112 and 114) and the virtual storefront system may facilitate purchasing products via an embedded virtual storefront that allows for direct purchases of goods in the storefront and marketplace sources without requiring to redirect to each of these sources. In an aspect, the virtual storefront server (104) and the virtual storefront database (108) may be implemented on a cloud based platform.

The virtual storefront server (106) along with the communicatively coupled virtual storefront database (108) are configured to send information related to the virtual storefront to the topical online community server (104) for displaying the virtual storefront embedded in the topical community web page on the user terminal (102). In an embodiment, the virtual storefront may be embedded in the topical online community web page by means of a native extension mechanism such as Native Extensions for Adobe AIR. The virtual storefront footprint on the site is configurable and determined by the embedder. Provisions are made for seamless integration, including but not limited to embedder-specified styling, support for the community's form of virtual currency (if any), and technology adaptation such as a Flash-based store presence in Flash games, HTML5-based presence in HTML5 sites, and the like. The storefront may enable the users or members of the topical online community visiting the online community web page to access the virtual storefront for purchasing one or more products displayed in the storefront. In an aspect, the virtual storefront may allow the users or community members of the topical online community to provide certain input regarding a product such as information regarding the quality of the product, 'wish list', 'likes', and the like. Such input regarding a product provided by a community member is inputted by means of the user terminal (102) and stored in the virtual storefront database (108). In an aspect, the virtual storefront server (106) may be configured to generate certain statistical information related to the one or more products displayed in the virtual storefront. The statistical information related to the one or more products displayed in the virtual storefront may be stored in the virtual storefront database (108) such that the information may be readily available to the virtual storefront server (106). In an aspect, the statistical information related to the one or more products may include number of actual sales, number of 'wants', 'loves', 'likes' for a product.

The embedded virtual storefront includes a template and one or more products extracted from the one or more storefront servers (110) and marketplace servers (112 and 114). The products are displayed within the template and are arranged based on one or more factors. The virtual storefront embedder or topical community web page administrator may be provided with an option to embed a virtual storefront widget in the topical community web page. In an aspect, the embedder upon selecting the option for embedding the virtual storefront may be provided with an option to select one or more storefront servers (110) and/or marketplace servers (112 and 114) from a plurality of available storefront servers and marketplace servers to be queried for product search and extraction. In another aspect, the storefront servers (110) and/or marketplace servers (112 and 114) to be queried for product search and extraction are dynamically selected. In an embodiment, the products to be displayed in the virtual storefront may be statically selected by the embedder upon short listing the storefront servers and marketplace servers to be queried. For example, the embedder may be provided with a list of products available in the shortlisted storefront servers and/or marketplace servers from which the embedder may select one or more products that are then made available to community members or users. In an aspect, the embedder may be enabled to input one or more parameters using the user terminal (102).

In another embodiment, upon selecting the option for embedding the storefront widget one or more keywords related to the context of the topical community web page may be dynamically extracted by the virtual storefront server (106) from the topical community server (104). The virtual storefront server (106) may then dynamically extract one or more products available in the shortlisted storefront servers and/or marketplace servers. The dynamically extracted product related information may then be made available to the embedder for static selection. The selected products may then be made available to the community members or users for purchase at the virtual storefront. In an aspect, the embedder may input one or more parameters according to which the products relating to the keywords are finally displayed for purchase to the users. The parameters inputted by the embedder may include parameters such as products relating to the extracted keywords and liked most by a friend circle, colleague circle, gaming circle, and the like. The parameters inputted by the embedder may also include products relating to the extracted keywords and gone viral on the community web page such as products liked or shared the most within the topical community web page. For example, the topical community web page relating to a rock band may result in extraction of keywords such as the name of the band, name of the guitarist, name of the vocalist, name of the drummer, and the like. The keywords may result in shortlisting a plurality of products such as T-shirts, guitars, drum sets etc. The embedder may provide parameter such as products liked the most by topical community web page members that may result in extraction of T-shirts with the Band logo print that are extracted from the set of shortlisted products according to the keywords and that qualify the given parameter. The parameters are provided by the embedder using the user terminal (102). In an aspect, the parameters may be statically provided during the storefront configuration. In another aspect, the parameters may be provided dynamically for example, the embedder may dynamically provide parameters during an online sales campaign to focus on a particular product or a set of products or presentation cues. The parameters provided dynamically enable calls to be made with the latest and greatest contextual topics.

In another embodiment, the embedder upon selecting the option for embedding the storefront widget may be prompted to input one or more keywords and one or parameters for extracting the products available in the shortlisted one or more storefront servers (110) and marketplace servers (112 and 114). In an aspect, the administrator may provide keywords related to the context of the fan page, group or channel. For example, the administrator of a cricket team related fan page using the user terminal (102) may input keywords such as cricket, name of the team, name of the players, bat, bowl, stumps, shin guard, and the like that relate to the context of the fan page. The virtual storefront server (106) may then dynamically extract one or more product related information from the storefront servers (110) and marketplace servers (112 and 114) based on the one or more keywords provided by the embedder. Further, the parameters inputted by the embedder may include parameters such as products relating to the extracted keywords and liked most by a friend circle, colleague circle, gaming circle, and the like. The parameters inputted by the embedder may also include products relating to the extracted keywords and liked or shared the most within the topical community web page. The keywords as well as parameters are provided by the embedder via the user terminal (102). In an aspect, the information relating to one or more products may be the price of a product, images of a product, technical specification of a product, and the like. The information related to one or more products may be extracted based on one or more parameters.

In an aspect, the extracted products whether by dynamic extraction of keywords or static input of keywords may be arranged according to a ranking method. For example, the extracted products may be arranged according to a ranking method based on the number of clicks registered for a product, number of products purchased, according to virality, and the like. Further, the template of the storefront may either be automatically configured or may be manually configured by the embedder. The template may include one or more customizations such as banner image, logo placement information, white labels, color theme, and the like. Such customization may be stored in the virtual storefront server. In addition to the customizations provided by the embedder the template may be subject to constraints relating to the type of user terminal (102) used by the community member for accessing the virtual storefront. In an aspect, the virtual storefront is embedded in the web page such that the community members can view the information related to a product within the community webpage itself. In an aspect, a community member using a user terminal (102) such as a smartphone may be able to purchase the product on a web page without being directed to a separate web page.

The information related to the products is extracted from one or more of storefront servers (110) and marketplace servers (112 and 114) based on the keywords provided by the embedder or keywords dynamically extracted by the virtual storefront server and the parameters provided by the embedder. In an embodiment, the virtual storefront server (106) comprises of an adapter layer for extracting products from disparate storefronts, vendors, marketplaces based on the keywords, parameters and other inputs provided by the embedder when a community member access the virtual storefront. The adapter layer also extracts keyword based product recommendations and one or more product search results from the one or more stores or marketplaces. The virtual storefront server (106) also comprises of a presentation layer that presents the virtual storefront to the community member by optimized the view of the storefront based on the topical community web page supported such as Facebook® page, Twitter® product card, Pinterest® board, YouTube®, and the like and the platform/device of the user terminal (102) used by the community member. Further, the virtual storefront server (106) also comprises of one or more heuristic engines for determining the position of a product to be placed within the template, for example, a heuristic engine may place a premium on virality allowing the product placement to enhance the spread of the product. In an aspect, a particular heuristic engine may be selected by the embedder from a plurality of available heuristic engines depending on the placement of the storefront in the sales funnel of an organisation, for example, top-of-the-funnel stores might want the heuristic engine to focus on viral spread of a product whereas placements closer to the bottom of the funnel would require the heuristic engine to put a premium on conversion.

A community member may access the virtual storefront embedded in the topical community web page via the virtual storefront widget. The virtual storefront being opened for viewing, the virtual storefront server extracts and displays the products from the virtual storefronts or the marketplaces directly in the community web page without directing to a separate web page. Community members may then elect an option such as an XpressBuy® option to affect a purchase, at which point, the embedded storefront interacts with the marketplace merchants to finalize the purchase transaction. The purchases are enabled using secured end to end communication pipe between the user, the community server and the storefront/marketplace. The community member interacts only with the embedded storefront for purchasing one or more products related to separate storefronts and marketplaces and at the back end the virtual storefront server interacts with the storefront or marketplace servers for completing the purchase and thereby by providing a seamless experience to the community members. In an aspect, native authentication mechanisms such as Facebook® login, and the like thereby facilitating the purchase to be made fully within the context of the community web page. In an aspect, the community member accessing the virtual storefront may be presented the products statically. In another aspect, the community member may search for a product and thereby a product may be dynamically determined via the topical online community server initiating a call to a store API provided by the virtual storefront server.

Figure 2:
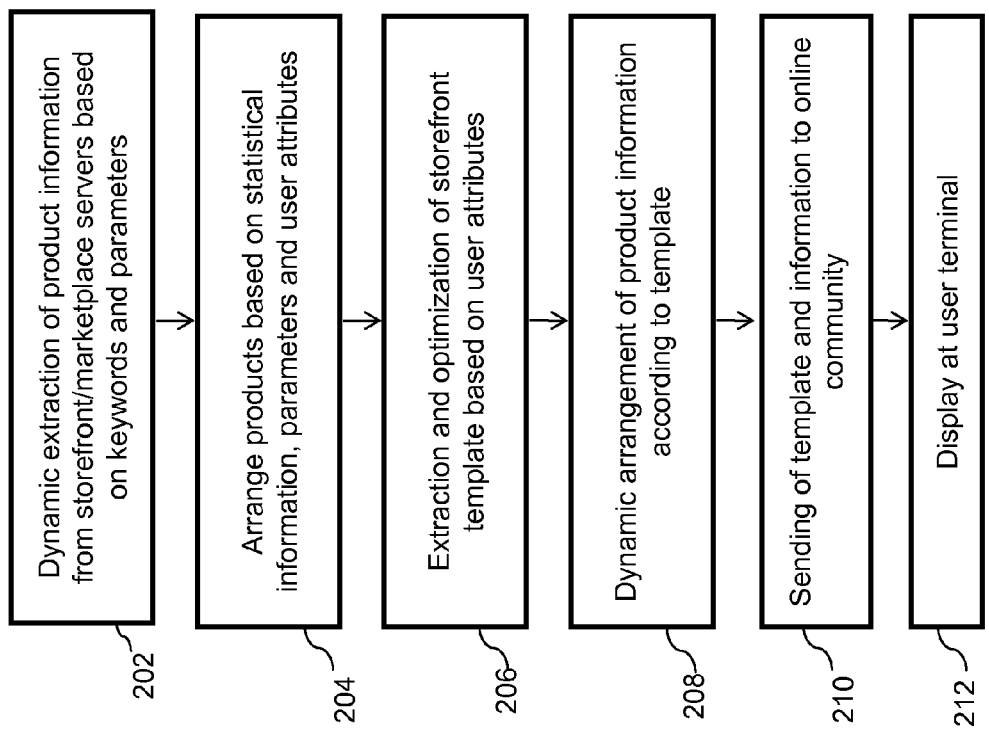
FIG. 2 illustrates a flow diagram for embedding and configuring a virtual storefront in a topical community web page.

FIG. 2 illustrates a method for embedding and configuring a virtual storefront in topical community web page. The virtual storefront server along with the communicatively coupled virtual storefront database are configured to send information related to the virtual storefront to the topical online community server for displaying the virtual storefront embedded in the topical community web page on the user terminal. In an embodiment, the virtual storefront may be embedded in the topical online community web page by means of a native extension mechanism such as Native Extensions for Adobe AIR. The virtual storefront footprint on the site is configurable and determined by the embedder. Provisions are made for seamless integration, including but not limited to embedder-specified styling, support for the community's form of virtual currency (if any), and technology adaptation such as a Flash-based store presence in Flash games, HTML5-based presence in HTML5 sites, and the like. The storefront may enable the users or members of the topical online community visiting the online community web page to access the virtual storefront for purchasing one or more products displayed in the storefront. In an aspect, the virtual storefront may allow the users or community members of the topical online community to provide certain input regarding a product such as information regarding the quality of the product, 'wish list', 'likes', and the like. Such input regarding a product provided by a community member is inputted by means of the user terminal and stored in the virtual storefront database. In an aspect, the virtual storefront server may be configured to generate certain statistical information related to the one or more products displayed in the virtual storefront. The statistical information related to the one or more products displayed in the virtual storefront may be stored in the virtual storefront database such that the information may be readily available to the virtual storefront server. In an aspect, the statistical information related to the one or more products may include number of actual sales, number of 'wants', 'loves', 'likes' for a product.

The embedded virtual storefront includes a template and one or more products extracted from the one or more storefront servers and marketplace servers. The products are displayed within the template and are arranged based on one or more factors. The virtual storefront embedder or topical community web page administrator may be provided with an option to embed a virtual storefront widget in the topical community web page. In an aspect, the embedder upon selecting the option for embedding the virtual storefront may be provided with an option to select one or more storefront servers and/or marketplace servers from a plurality of available storefront servers and marketplace servers to be queried for product search and extraction. In another aspect, the storefront servers and/or marketplace servers to be queried for product search and extraction are dynamically selected. In an embodiment, the products to be displayed in the virtual storefront may be statically selected by the embedder upon short listing the storefront servers and marketplace servers to be queried. For example, the embedder may be provided with a list of products available in the shortlisted storefront servers and/or marketplace servers from which the embedder may select one or more products that are then made available to community members or users. In an aspect, the embedder may be enabled to input one or more parameters using the user terminal.

In another embodiment, upon selecting the option for embedding the storefront widget one or more keywords related to the context of the topical community web page may be dynamically extracted by the virtual storefront server from the topical community server. The virtual storefront server may then dynamically extract one or more products available in the shortlisted storefront servers and/or marketplace servers. The dynamically extracted product related information may then be made available to the embedder for static selection. The selected products may then be made available to the community members or users for purchase at the virtual storefront. In an aspect, the embedder may input one or more parameters according to which the products relating to the keywords are finally displayed for purchase to the users. The parameters inputted by the embedder may include parameters such as products relating to the extracted keywords and liked most by a friend circle, colleague circle, gaming circle, and the like. The parameters inputted by the embedder may also include products relating to the extracted keywords and gone viral on the community web page such as products liked or shared the most within the topical community web page. For example, the topical community web page relating to a rock band may result in extraction of keywords such as the name of the band, name of the guitarist, name of the vocalist, name of the drummer, and the like. The keywords may result in shortlisting a plurality of products such as T-shirts, guitars, drum sets etc. The embedder may provide parameter such as products liked the most by topical community web page members that may result in extraction of T-shirts with the Band logo print that are extracted from the set of shortlisted products according to the keywords and that qualify the given parameter. The parameters are provided by the embedder using the user terminal.

In another embodiment, the embedder upon selecting the option for embedding the storefront widget may be prompted to input one or more keywords and one or parameters for extracting the products available in the shortlisted one or more storefront servers and marketplace servers. In an aspect, the administrator may provide keywords related to the context of the fan page, group or channel. For example, the administrator of a cricket team related fan page using the user terminal may input keywords such as cricket, name of the team, name of the players, bat, bowl, stumps, shin guard, and the like that relate to the context of the fan page. The virtual storefront server may then dynamically extract one or more product related information from the storefront servers and marketplace servers based on the one or more keywords provided by the embedder. Further, the parameters inputted by the embedder may include parameters such as products relating to the extracted keywords and liked most by a friend circle, colleague circle, gaming circle, and the like. The parameters inputted by the embedder may also include products relating to the extracted keywords and liked or shared the most within the topical community web page. The keywords as well as parameters are provided by the embedder via the user terminal. In an aspect, the information relating to one or more products may be the price of a product, images of a product, technical specification of a product, and the like. The information related to one or more products may be extracted based on one or more parameters.

In an aspect, the extracted products whether by dynamic extraction of keywords or static input of keywords may be arranged according to a ranking method. For example, the extracted products may be arranged according to a ranking method based on the number of clicks registered for a product, number of products purchased, according to virality, and the like. Further, the template of the storefront may either be automatically configured or may be manually configured by the embedder. The template may include one or more customizations such as banner image, logo placement information, white labels, color theme, and the like. Such customization may be stored in the virtual storefront server. In addition to the customizations provided by the embedder the template may be subject to constraints relating to the type of user terminal (102) used by the community member for accessing the virtual storefront. In an aspect, the virtual storefront is embedded in the web page such that the community members can view the information related to a product within the community webpage itself. In an aspect, a community member using a user terminal (102) such as a smartphone may be able to purchase the product on a web page without being directed to a separate web page.

Figure 3:
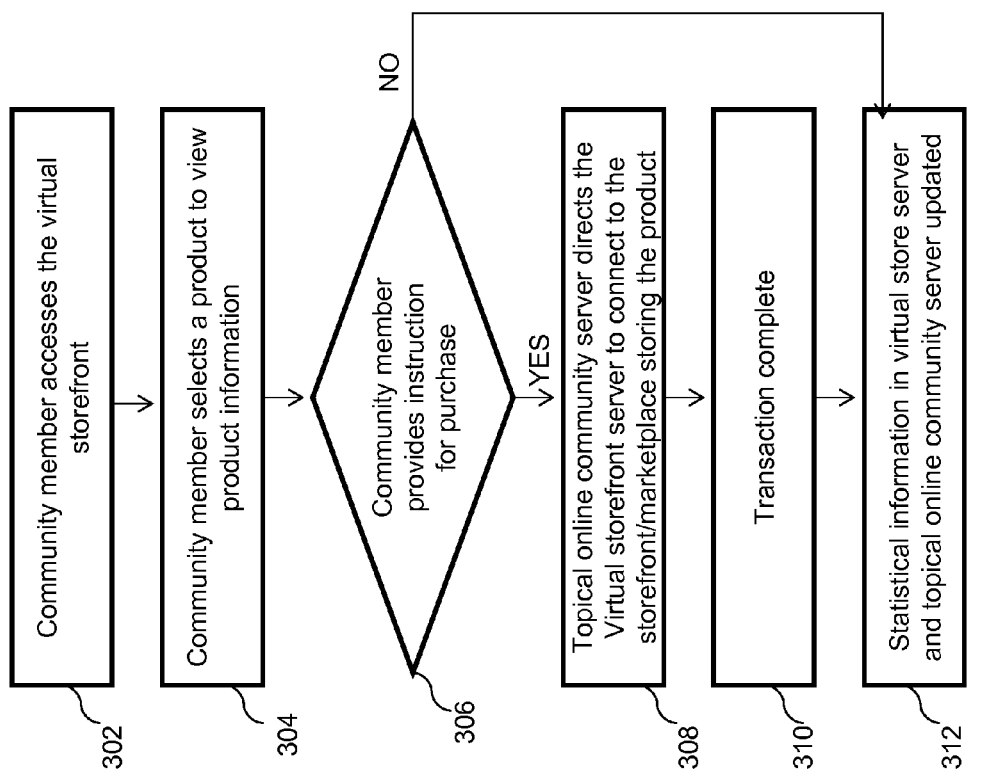
FIG. 3 illustrates a flow diagram for enabling a purchase on a virtual storefront embedded in a topical community web page.

FIG. 3 depicts a flowchart illustrating a method for enabling a community member to purchase a product displayed in a virtual storefront embedded in a topical community web page. The community member accesses (302) the virtual storefront using a user terminal. In an aspect, the topical online community server may make a system call to the virtual storefront server for providing the storefront information including the template and the extracted products to be displayed based on the keywords and parameters provided by the embedder. In an aspect, the products may be dynamically arranged in an order according to the statistical data related to the community web page. In another aspect, the products may be dynamically arranged according to the statistical information related to the products in displayed on the community web page. In an aspect, the template of the virtual storefront may be stored in the virtual storefront database. In another aspect, the template of the virtual storefront displayed on the user terminal may be automatically determined and selected based on the user terminal attributes such as whether the user terminal is a smartphone or a tablet or a laptop and the like and also based on the topical community web page attributes such as whether the topical web page is a Twitter® web page or Facebook® fan page or a YouTube® channel or a YouTube® video, and the like. In an aspect, the products may be dynamically placed in the template according a federated recommendations engine and/or a topic/context engine, and the like wherein the engine is either a part of the virtual storefront server or communicatively coupled with the server.

Then, the virtual storefront is displayed to the community member. For example, a Facebook® user being member of a cricket team fan page may be sent a post during a match of the cricket team for promoting one or more merchandize of the team. The user may be provided a storefront widget by means of the post or the storefront widget may be provided on the fan page of the team. The storefront opens in the fan page itself unlike any other ad that directs the user to a landing site away from the community web page. In an aspect, the virtual storefront may be provided manually such as a tweet or post from a community web page followed or liked by the user. In another aspect, the virtual storefront may be provided dynamically such as a user conducting a search on the online topical community and thereon being provided with one or more virtual storefront widgets related to one or more virtual stores. In yet another aspect, the virtual storefront may be provided by means of a storefront widget embedded in a community web page that is browsed by the user.

The community member may select a product to view product information (304). The community member may further provide instructions for purchasing a product (306). Upon receiving a purchase instruction at the embedded virtual storefront the Virtual storefront server connects to the storefront/marketplace storing the product (308). Thus, the transaction is completed (310). In an aspect, the statistical information related to the topical community webpage and the statistical information related to the products are then updated in the topical online community server and the virtual storefront server (312), In an aspect, activities such as purchases, product views, aborted purchase attempts, and the like may be tracked for the virtual embedded storefront. Such data may then be utilized later for maximizing the potential sales. For example, such data may enable arranging the products in order of products most purchased, products most purchased by friends of the community member and/or members of the same social circle, products most viewed, products most viewed by friends. In another aspect, products may be arranged in order to maximize the possibility of sale, for example, products most likely to be purchased may be given more screen space.

In an embodiment, a community member may access the virtual storefront embedded in the topical community web page via the virtual storefront widget. The virtual storefront being opened for viewing, the virtual storefront server extracts and displays the products from the virtual storefronts or the marketplaces directly in the community web page without directing to a separate web page. Community members may then elect an option such as an XpressBuy® option to affect a purchase, at which point, the embedded storefront interacts with the marketplace merchants to finalize the purchase transaction. The purchases are enabled using secured end to end communication pipe between the user, the community server and the storefront/marketplace. In an aspect, native authentication mechanisms such as Facebook® login, and the like facilitate authentication and extraction of transaction related information related to the user so that the purchase is made fully within the context of the community web page. In an aspect, the community member accessing the virtual storefront may be presented the products statically. In another aspect, the community member may search for a product and thereby a product may be dynamically determined via the topical online community server initiating a call to a store API provided by the virtual storefront server.

Figure 4:
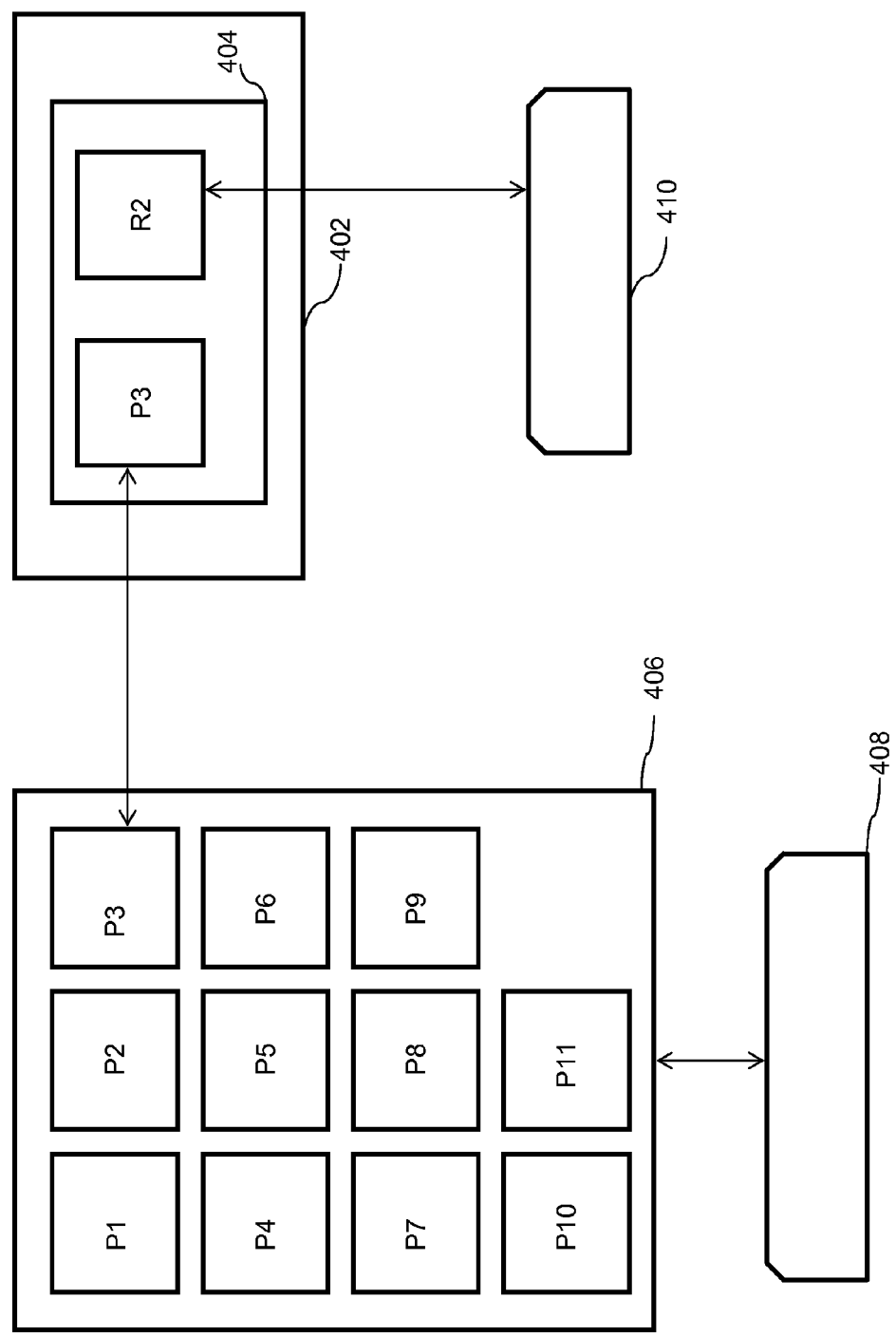
FIG. 4 illustrates an embedded virtual storefront deriving its products form a storefront and a marketplace.
Figure 5:
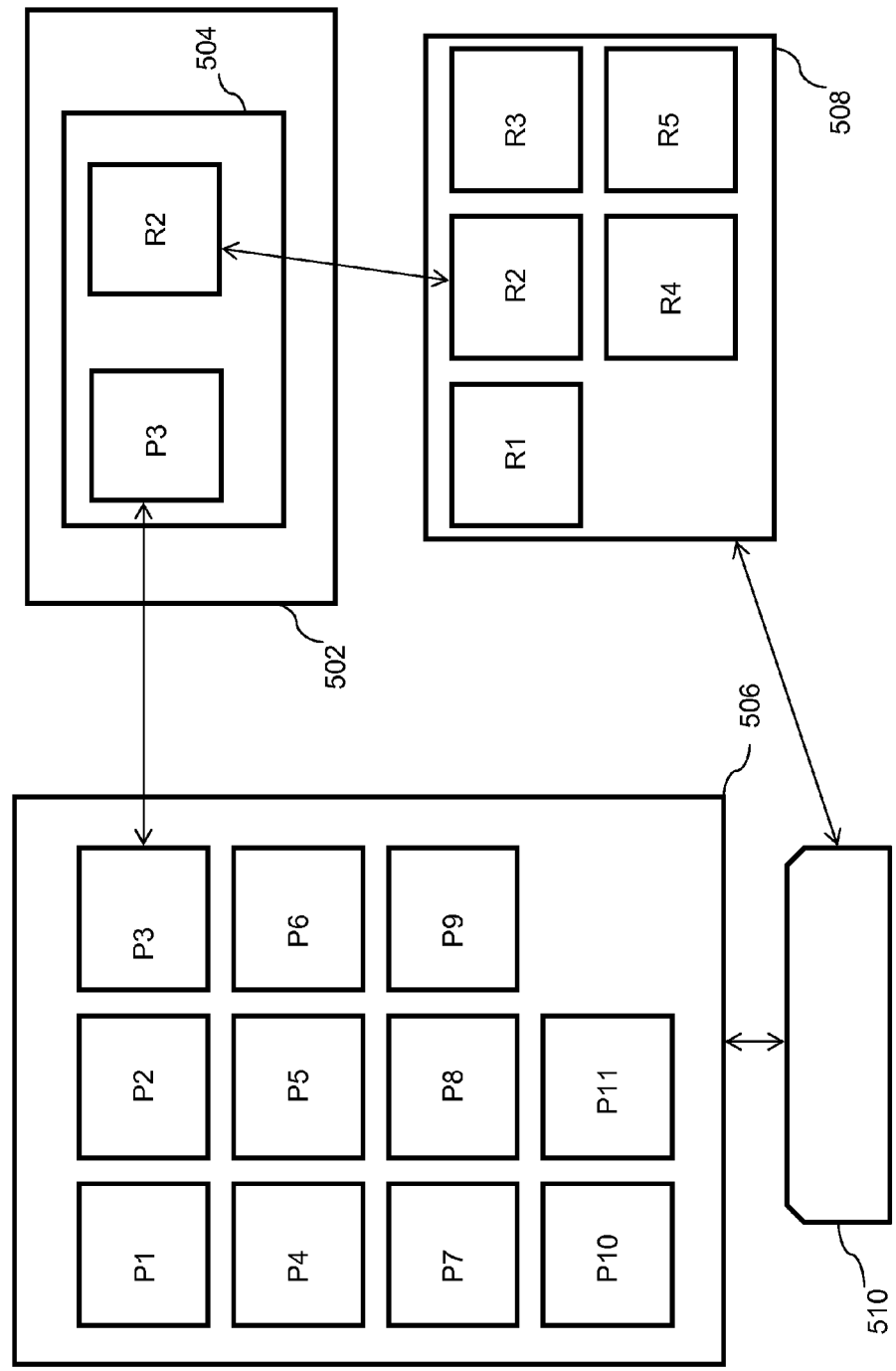
FIG. 5 illustrates an embedded virtual storefront deriving its products from two storefronts.
Figure 6:
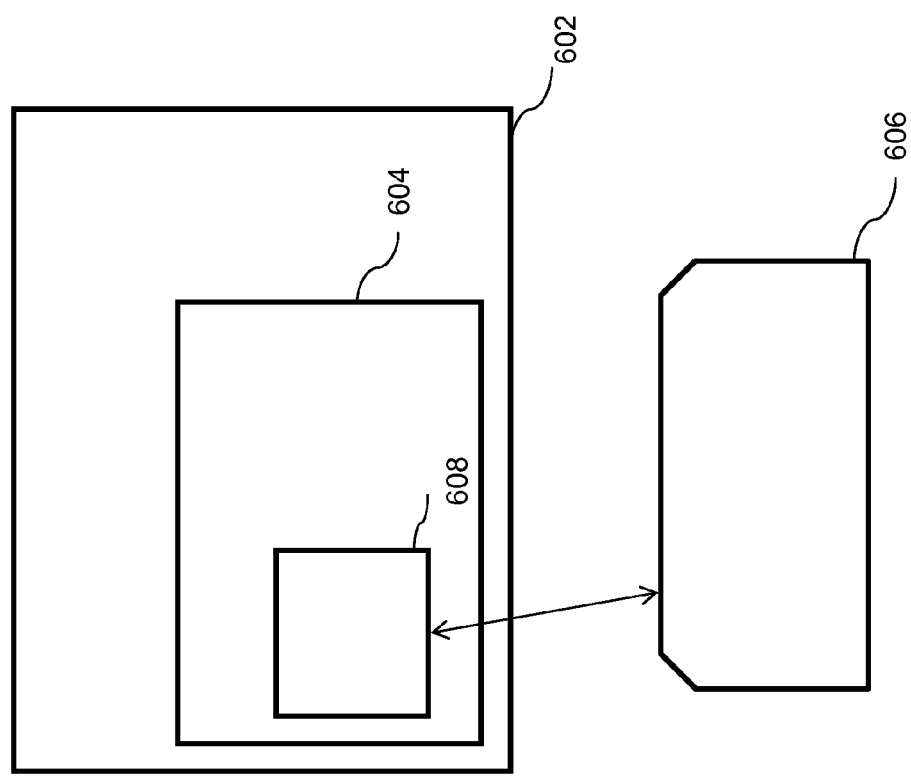
FIG. 6 illustrates an embedded virtual storefront deriving its products directly from a marketplace.

The virtual storefront system as described above may enable interaction between the virtual storefront with a variety of storefronts, marketplaces, and combinations thereon. FIG. 4, FIG. 5 and FIG. 6 illustrate different variations of the virtual storefront system. Specifically, FIG. 4 depicts a block diagram illustrating the interaction between a virtual storefront (404) embedded in a topical community web page (402) and a storefront (406) and a marketplace (410), according to an embodiment. The template of the embedded virtual storefront (404) may be based on the specifications of the topical community web page (402) or the topical online community and the user terminal used by a user of the virtual storefront. For example, a template may be dynamically extracted based on whether the user is accessing the virtual storefront on a Facebook® page, Twitter® product card, Pinterest® board, YouTube® channel, and the like. The products displayed in the virtual storefront (404) may be statically selected by the embedder or dynamically extracted by the virtual storefront server as described above. In an aspect, the display order of the products may be based on a ranking method such as the number of clicks for a product, number of products purchased, virality, and the like. In another aspect, the display order of the products may be based on the factors determining the enhanced possibility of sales of the products, for example, providing a prominent screen space for a product.

FIG. 5 depicts a block diagram illustrating the interaction between a virtual storefront (504) embedded in a topical community web page (502) and a first storefront (506) and a second storefront (508), according to an embodiment. The embedded virtual storefront (504) is configured for deriving one or more products (P3 and R2) from one or more selected storefronts of a marketplace (510) based on one or more conditions described above.

FIG. 6 illustrates an embedded virtual storefront deriving its products directly from a marketplace. The block diagram depicts a block diagram illustrating the interaction between a virtual storefront (604) embedded in a topical community web page (602) directly with a marketplace (606), according to an embodiment. The virtual storefront extracts and displays a product (608) in accordance with the methods described above. In an embodiment, the context of the topical community web page (602) directly drives the dynamic population of the product (608) and such products are displayed in the embedded virtual storefront.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

While for purposes of simplicity of explanation, the illustrated methodologies are shown and described as a series of blocks/steps, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Software embodiments, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, or communicate the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical). In addition, the scope of the present disclosure includes embodying the functionality of the example embodiments of the present disclosure in logic embodied in hardware or software-configured mediums.

The preceding description has been presented with reference to various embodiments. Persons skilled in the art and technology to which this application pertains will appreciate that alterations and changes in the described structures and methods of operation can be practiced without meaningfully departing from the principle, spirit and scope.

The invention claimed is:

1. A virtual storefront system configured for dynamically displaying one or more products in a virtual storefront embedded in a topical online community web page for selling, wherein the system comprises:
   a topical online community server connected to a user terminal via a network and configured for presenting the topical online community web page of a topical online community on the user terminal and dynamically generating statistical information of the topical online community web page;
   a virtual storefront server communicatively coupled with a virtual storefront database comprising statistical information related to the one or more products, the topical online community server, and at least one of a storefront server or a marketplace server, the at least one storefront server or marketing server containing information relating to the one or more products,
   wherein the virtual storefront server is configured for:
      extracting one or more products from the at least one storefront server or marketplace server based on one or more parameters, wherein the one or more parameters comprises one or more keywords provided by an administrator of the topical online community web page;
      extracting a storefront template from one or more storefront templates stored in the virtual storefront database based on attributes related to the user terminal and topical online community;
      dynamically arranging the one or more extracted products within the extracted storefront template based on the statistical information related to the topical online community web page;
      sending the storefront template having the dynamically arranged one or more extracted products to the topical online community server for display at the user terminal;
      and receiving one or more user transaction instructions from the user terminal via the topical online community server, wherein the virtual storefront server is further configured for facilitating a transaction in accordance with the transaction instruction directly with the storefront server or marketplace server through the embedded virtual storefront.

2. The virtual storefront system as claimed in claim 1 wherein the Virtual Storefront server and Virtual Storefront database are hosted over a cloud computing platform.

3. The virtual storefront system as claimed in claim 1 wherein the Virtual Storefront server includes an adapter layer for extracting product information, keyword based product recommendations, and one or more product search results from the one or more stores or marketplaces.

4. The virtual storefront system as claimed in claim 1 wherein the template includes one or more customizations comprising one or more of banner images, white labels, color theme and logo placement information.

5. The virtual storefront system as claimed in claim 1, wherein the online topical online community is a social networking website and the topical online community web page is a group specific web page.

6. The virtual storefront system as claimed in claim 1, wherein the topical online community is a discussion site or an informational site.

7. The virtual storefront system as claimed in claim 1, wherein the topical online community is a video-sharing website and the topical online community web page is a video channel web page.

8. The virtual storefront system as claimed in claim 1, wherein the topical online community is a video-sharing website and the topical online community web page is a video.

9. The virtual storefront system as claimed in claim 1, wherein the statistical information related to the one or more products is provided from the topical online community server to the virtual storefront server.

10. The virtual storefront system as claimed in claim 1, wherein the statistical information of the topical online community web page comprises one or more of number of members of the community webpage, number of likes registered for a particular post, and number comments on a forum discussion post.

11. The virtual storefront system as claimed in claim 1, wherein the statistical information related to the one or more products comprises one or more of number of actual sales of a product, number of 'wants' registered for a product, and 'likes' registered for a product.

12. The virtual storefront system as claimed in claim 1, wherein the virtual storefront server further comprises a heuristic engine configured for arranging the products in the template.

13. A processor implemented method for dynamically displaying one or more products in a a virtual storefront embedded in a topical online community web page of a topical online community, the method comprising:
   presenting, by a topical online community server to a user terminal, the topical online community webpage and generating statistical information of the topical online community web page;
   extracting one or more products by a virtual storefront server from at least one of a storefront server and a marketplace server based on one or more parameters, wherein the one or more parameters comprises one or more keywords provided by an administrator of the topical online community web page;
   extracting a storefront template by the virtual storefront server from one or more storefront templates stored in a virtual storefront database based on attributes related to the user terminal and the topical online community;

dynamically arranging the one or more extracted products within the extracted storefront template based on the statistical information related to the topical online community web page;

sending the storefront template having the dynamically arranged one or more extracted products to the topical online community server related to the topical online community forum for display at the user terminal;

receiving one or more user transaction instructions from the user terminal via the topical online community server; and, facilitating, by the virtual storefront server, a transaction in accordance with the transaction instruction directly with the storefront server or marketplace server through the embedded virtual storefront.

14. The method as claimed in claim 13, wherein one or more parameters may be inputted by the administrator wherein the parameters comprise one or more of products relating to the extracted keywords and liked most by a friend circle, products relating to the extracted keywords and colleague circle, products relating to the extracted keywords and gaming circle.

* * * * *